United States Patent
Lilja et al.

(10) Patent No.: US 10,950,941 B2
(45) Date of Patent: Mar. 16, 2021

(54) CONDUCTIVE STRUCTURAL MEMBER ACTING AS SINGLE-ENDED NFC ANTENNA

(71) Applicant: Microsoft Technology Licensing, LLC, Redmond, WA (US)

(72) Inventors: Juha Lilja, Tampere (FI); Ilkka Mikael Yli-Peltola, Tampere (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 100 days.

(21) Appl. No.: 15/358,070

(22) Filed: Nov. 21, 2016

(65) Prior Publication Data

US 2018/0145398 A1    May 24, 2018

(51) Int. Cl.

| | | |
|---|---|---|
| *H01Q 1/22* | (2006.01) |
| *H01Q 7/00* | (2006.01) |
| *H04B 5/00* | (2006.01) |
| *H01Q 1/48* | (2006.01) |
| *H01Q 1/24* | (2006.01) |
| *H01Q 5/364* | (2015.01) |

(52) U.S. Cl.
CPC ............. *H01Q 7/00* (2013.01); *H01Q 1/243* (2013.01); *H01Q 1/48* (2013.01); *H01Q 5/364* (2015.01); *H04B 5/0056* (2013.01); *H04B 5/0081* (2013.01)

(58) Field of Classification Search
CPC ........ H01Q 1/2291; H01Q 1/243; H01Q 1/48; H01Q 7/00; H04B 5/0081
See application file for complete search history.

(56) References Cited

U.S. PATENT DOCUMENTS

| | | |
|---|---|---|
| 8,249,524 B2 | 8/2012 | Darwhekar et al. |
| 8,489,020 B2 | 7/2013 | Bangs et al. |

(Continued)

FOREIGN PATENT DOCUMENTS

| | | |
|---|---|---|
| CN | 101577361 A | 11/2009 |
| WO | 2012136026 A1 | 10/2012 |

OTHER PUBLICATIONS

Gebhart, et al., "Automated Antenna Impedance Adjustment for Near Field Communication (NEC)", In Proceedings of 12th International Conference on Telecommunications, Jun. 26, 2013, pp. 235-242.

(Continued)

*Primary Examiner* — Dameon E Levi
*Assistant Examiner* — David E Lotter

(57) ABSTRACT

In an embodiment, conductive structural members of a device acting as NFC antenna are described. According to an embodiment, a device comprises: two conductive structural members, each comprising a first electrical end and a second electrical end, a dielectric isolation being configured between the first electrical end of the first conductive structural member and the first electrical end of the second conductive structural member; two NFC antenna feeds, the first feed being electrically coupled with the first electrical end of the first member, the second feed being electrically coupled with the first electrical end of the second member; two grounding components, one each grounding the second electrical end of the conductive structural members; at least one additional antenna feed configured for a frequency other than that of NFC, coupled to either of the two members.

20 Claims, 4 Drawing Sheets

(56) References Cited

U.S. PATENT DOCUMENTS

| | | |
|---|---|---|
| 9,125,007 B2 | 9/2015 | Konanur et al. |
| 9,294,156 B2 | 3/2016 | Li et al. |
| 2012/0091821 A1* | 4/2012 | Kato ................ H01Q 1/38 |
| | | 307/104 |
| 2013/0147675 A1* | 6/2013 | Kato ................ H01Q 1/38 |
| | | 343/788 |
| 2013/0207852 A1* | 8/2013 | Nakano ............ H01Q 1/2225 |
| | | 343/702 |
| 2014/0231518 A1* | 8/2014 | Yosui ............... H01Q 1/2216 |
| | | 235/439 |
| 2015/0138030 A1* | 5/2015 | Yosui ............... H01Q 1/38 |
| | | 343/895 |
| 2015/0180542 A1 | 6/2015 | Jang et al. |
| 2016/0380337 A1* | 12/2016 | Lee ................. H01Q 1/243 |
| | | 343/702 |
| 2017/0117093 A1* | 4/2017 | Kim ................. G06F 1/163 |
| 2017/0272127 A1* | 9/2017 | Jang ................ H04B 5/0081 |

OTHER PUBLICATIONS

"PN7120 Antenna Design and Matching Guide", Published on: Apr. 8, 2015, 61 pages, Available at: http://www.nxp.com/documents/application_note/AN11564.pdf.

* cited by examiner

US 10,950,941 B2

CONDUCTIVE STRUCTURAL MEMBER ACTING AS SINGLE-ENDED NFC ANTENNA

BACKGROUND

Near field communication (NFC) capability may be present in various devices like smartphones, tablets, phablets etc. NFC may be used for various purposes, including authentication, access control, monetary transactions, as a bootstrap for data transfer using a faster technology, etc. A device with NFC capability may have an NFC antenna to enable communication. Since the NFC standard uses relatively large wavelengths, NFC antenna dimensions may be quite large with respect to other components in a device.

A device may comprise a metallic cover for aesthetic or design reasons. A metallic cover may shield the NFC antenna as well as other antennas present in the device, leading to reduced functionality. To enable communication, a metal cover of a device may have slits.

Phone manufacturers implement NFC antennas as coiled loops isolated from metallic parts of the device with ferrites. A majority of NFC antennas have a differential design.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

In an embodiment, a conductive structural member of a device acting as a single-ended NFC antenna is described. The conductive structural member can be, for example, a metallic frame with a back panel. An NFC circuit inside the device is connected to a signal terminal on the conductive structural member, and to a ground terminal. The current path on the conductive structural member creates an NFC antenna loop.

Many of the attendant features will be more readily appreciated as they become better understood by reference to the following detailed description considered in connection with the accompanying drawings.

DESCRIPTION OF THE DRAWINGS

The present description will be better understood from the following detailed description read in light of the accompanying drawings, wherein.

Like references are used to designate like parts in the accompanying drawings.

DETAILED DESCRIPTION

Figure 1:
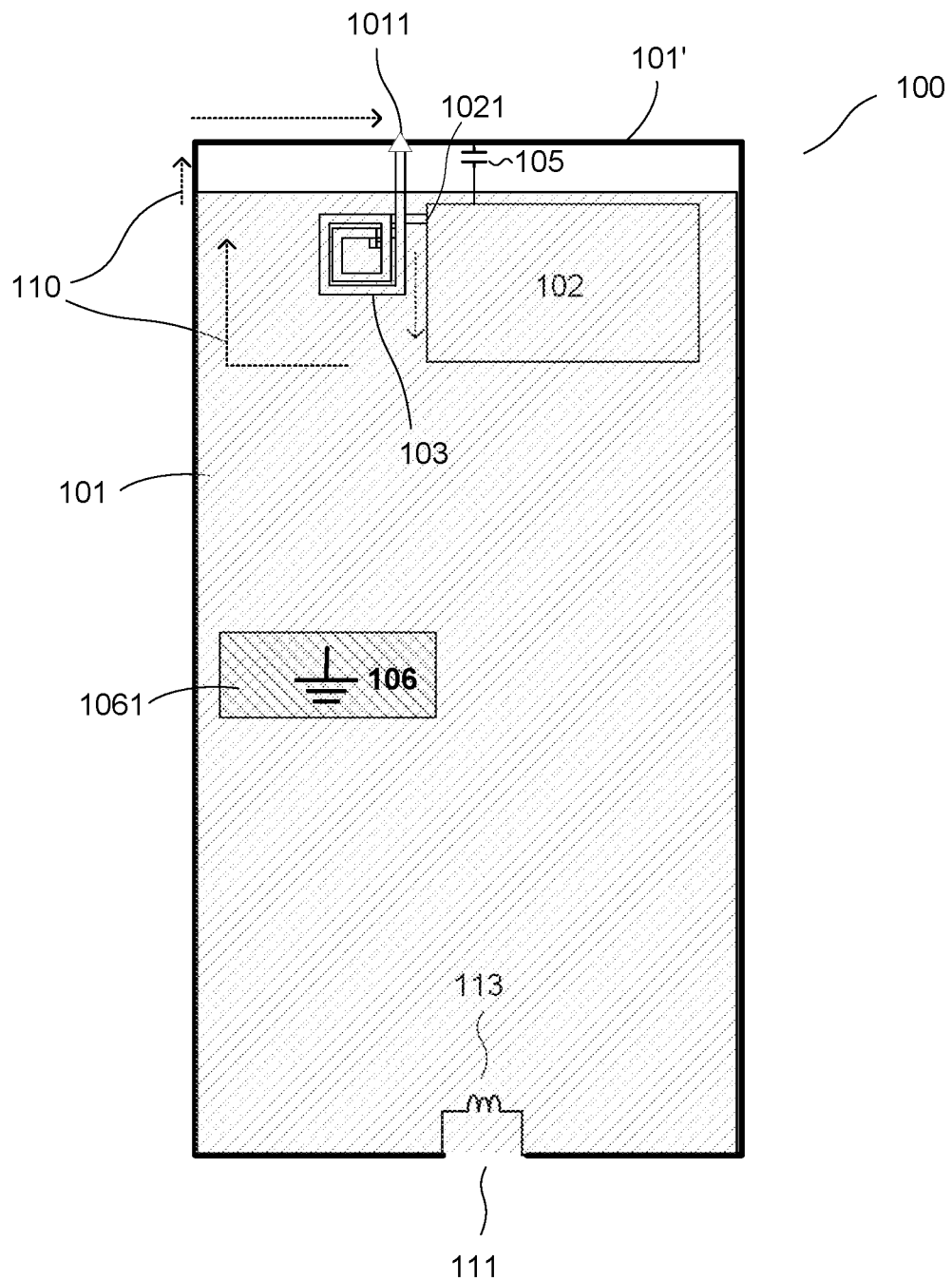
FIG. 1 is a schematic illustration of a conductive structural member acting as an NFC antenna, according to an embodiment.

The detailed description provided below in connection with the appended drawings is intended as a description of the embodiments and is not intended to represent the only forms in which the embodiment may be constructed or utilized. However, the same or equivalent functions and structures may be accomplished by different embodiments.

Although the embodiments may be described and illustrated herein as being implemented in a smartphone, this is only an example implementation and not a limitation. As those skilled in the art will appreciate, the present embodiments are suitable for application in a variety of different types of devices comprising near field communication (NFC) functionality, for example, laptop-tablet hybrids, tablets, phablets, portable gaming consoles, portable music players, portable NFC readers, portable point of sale payment processors, etc.

Although some embodiments may use the phrase "printed wire board (PWB)", it is for illustrative purposes only and not intended as a limitation in any way. According to an embodiment, the PWB may include various structures that may mechanically support and/or electrically connect electric and electronic components, for example, Printed Circuit Board (PCB), Printed Circuit Assembly (PCA), Printed Circuit Board Assembly (PCBA), Circuit Card Assembly (CCA), Flexible Printed Circuit (FPC), etc.

Near field communication (NFC) requires an antenna of one near field communicator to be present within the alternating magnetic field generated by the antenna of another near field communicator by transmission of a signal (for example a 13.56 MegaHertz signal) to enable the magnetic field of the signal to be inductively coupled between the communicators. The signal may be modulated to enable communication of control and/or other data. Below, NFC communicators embedded in devices are described. As it is clear to a skilled person, the described NFC antennas may need to be compatible with existing Radio Frequency Identifier (RFID) readers and/or tags. These antennas may also be operable as NFC communicators or NFC tags.

According to an aspect, the NFC antenna utilizes a conductive structural member of the device to create a single-ended NFC antenna loop. In an embodiment, the antenna loop is created in an area of a substantially flat conductive structural member. The conductive structural member of the device may include parts of a back panel, a metal frame, a printed wiring board (PWB), or any other suitable conducting structural element equipped with a signal terminal for single-ended antenna feed. The current paths may be adjusted in the conductive structural member such that an inductive coil creating an antenna loop is not needed for the antenna operation. The antenna loop may be continuous or physically open, and the latter may include an opening including capacitors or inductors (or a combination thereof) to form a current path at 13.56 Megahertz, and filter other possible antennas and radios from interacting with the NFC signals.

The device can have the effect of not requiring a separate NFC antenna, and manufacturing costs and space within the device may be saved. A better design of the housing of the device may be achieved, because existing dielectric apertures or slots of the housing, which are found in the design of the cover and housing, may be utilized for establishing the antenna. There may also not be a need for dielectric isolation of the antenna loop from conductive structural members of the device such as the back cover, since the antenna loop uses these parts. Device size, and in particular thickness, may be reduced.

FIG. 1 is a schematic representation of a posterior view of a device 100 with a back panel 101 shown transparent to reveal parts of the internal structure. The device may be any device with NFC functionality, a mobile device, a stationary NFC device, etc. In the embodiment shown in FIG. 1, the device 100 comprises a conductive structural member comprising a back panel 101 and a conductive frame 101'. As an example only, the back panel 101 and frame 101' may be metallic according to the design of the device 100.

The conductive structural member includes a single signal terminal 1011, and a ground terminal 1061. The conductive structural member forms a single-ended NFC antenna that operates via currents that are created in the conductive structural member. FIG. 1 shows an example of a conductive structural member implemented in the conductive back cover 101 and frame 101'. In other embodiments, the conductive structural member may be any component of a device 100 which exhibits electrical conductivity, and which may not be configured exclusively for NFC functionality. The other functions of a conductive structural member may include providing mechanical strength, providing electromagnetic shielding, acting as a component of the device cover, etc. The conductive structural members may be a portion of a body, a portion of a chassis, a portion of a housing, or a portion of a cover of the device, a portion of the printed wiring board (PWB), or any other suitable conducting member.

The device 100 also comprises an NFC circuit 102 configured to supply a communication signal to the signal terminal 1011 of the conductive structural member. In an embodiment, the communication signal is supplied to the signal terminal 1011 at a frequency of 13.56 megahertz. Excitation of currents at this frequency can provide compatibility with existing NFC devices. The NFC circuit 102 may comprise an integrated circuit and a matching circuit. The integrated circuit may include an NFC controller configured to control the general operation of NFC send signals to or receive signals from the NFC signal terminal 1011 and perform other necessary operations. The matching circuit may comprise elements of an impedance matching and transformation network configured to provide optimal power to the antenna.

The device 100 comprises a grounding component 106 operable as a return path for the communication signal via the ground terminal 1061 of the conductive structural member. The grounding component 106 may be implemented as a structural extension of the same conductive structural member, in a PWB, or as a separate grounding component. FIG. 1 illustrates the grounding component 106 as a separate box for clarity purposes only.

According to an embodiment, the grounding component 106 may comprise a capacitive component. The capacitance of the capacitive component may be selected such that, at frequencies higher than those corresponding to NFC it behaves as a short circuit, while at frequencies corresponding to NFC it behaves as an open circuit. Such configuration may ensure that currents corresponding to NFC traverse the whole length of the conductive structural member, forming an NFC antenna with aperture substantially equal to size of the conductive element.

According to an embodiment, components of the device 100 are arranged in such a manner that substantially circular paths 110 are provided to the currents in the conductive structural member. The communication signal supplied by the NFC circuit 102 may excite a current in the conductive structural member such that the current direction is from the signal terminal 1011 along the structure and toward the ground terminal 1061 and the grounding component 106; then from the grounding component 106 the current can travel back to the signal terminal 1011. According to an embodiment, the path 110 traversed by the currents may be substantially annular or circling a path. Consequently, a current loop may be established. The current direction may be, for example, clockwise or counter-clockwise in the loop.

The antenna currents 110 are illustrated only schematically and may vary depending on the shape and positioning of the conductive structural member and the signal terminals 1011, 1061. Circular paths for antenna currents provide the NFC antenna functionality by generating magnetic fields that allow coupling of the antenna element with other external NFC elements. This can have the effect of removing the need to use a separate magnetic coil to create an NFC antenna element.

The signal terminal 1011 of FIG. 1 is illustrated to be connected to the conductive structural member on the conductive frame 101', which may provide a suitable arrangement when the device 100 comprises a conductive device cover 101 and frame 101'. However, the signal terminal 1011 may be positioned on any other part of the device suitable for the arrangement to form a single-ended NFC antenna element in the conductive structural member.

The single-ended NFC antenna element that is formed in a device's conductive cover or any other conductive element can have a technical effect of saving space in the device due to only a few additional components added to create an NFC circuit. Since a single-ended connection only requires one contact point to the conductive structural member, this can make hardware integration of the antenna easier for smaller devices. Additionally, this design can be compatible with various NFC integrated circuits that support single-ended NFC antennas.

In an embodiment, the device 100 also comprises an inductive coil 103 through which the NFC circuit 102 is connected to the conductive structural member. The inductive coil 103 is an optional element that can improve the inductance of the NFC antenna element. In an alternative embodiment, the conductive part of the device cover 101 is long enough to compensate for the absence of the additional connecting inductive coil 103.

According to an embodiment, the device 100 comprises a printed wiring board (PWB) (not shown in the FIGS. 2a-2b) and the inductive coil 103 is etched in the PWB. This can decrease the overall number of components, which makes hardware integration simpler and may reduce the overall cost. The PWB may be configured on a chassis. The PWB may be configured such that a battery may be positioned below it. Various other components like a processor, memory, cellular radio baseband chips, or NFC controllers may be configured on the PWB.

In an embodiment, the device 100 also comprises a capacitor 105 connected in parallel to the conductive structural member and the inductive coil 103. The capacitor 105 can amplify the currents 110 flowing in the conductive structural member, and increase the overall performance of the NFC antenna element. In FIG. 1 the capacitor 105 is positioned near the other elements and the signal terminal 1011. In other embodiments the capacitor 105 may be separated in space from the coil 103 and signal terminal 1011, and reside in other suitable positions between conductive structural members of the device. In an alternative embodiment, the capacitor 105 is optional and a device may be configured to couple with external NFC elements at low inductance to compensate for the absence of the capacitor 105.

According to an embodiment, the conductive structural member forms a continuous single-ended NFC antenna loop. In alternative embodiments, the antenna loop may have a break and be physically open. The open end may comprise capacitors and/or inductors to form a path for current at 13.56 MHz, and filter other antennas/radios from being affected by NFC signals and vice versa.

Device 100 may comprise various other components like a display, a camera, additional wireless communication components and others. In an embodiment, the device 100 further comprises a receiver coupled to the NFC circuit 102. The receiver can be configured to receive a signal inductively coupled, via a magnetic field from another NFC device in the near field range, and provide the received signal to the NFC antenna circuit.

According to an embodiment, at least one additional antenna feed is coupled to the conductive structural member via a capacitor. Elements of the conductive structural member can be arranged such that at least one additional antenna feed is filtered from the NFC signals. The additional antenna feed can be configured for a frequency range suitable for at least one of: Wireless Local Area Network, FM-Radio, Long Term Evolution Wideband Low Band, Global Navigation Satellite System, Global Positioning System, BeiDou Satellite Navigation System, or a non-cellular wireless system. These various radio systems can share the same conductive structural members, which are acting as the antenna radiators, by means of decoupling, because the NFC frequency range 13.56 MHz is different from other frequencies, which may typically be higher than 700 MHz.

At least one gap 111 may be configured in the conductive structural member for various design considerations. The design considerations for one or more gaps 111 may include allowing access to connectivity and/or charging ports, slots for memory or Subscriber Identity Module, SIM cards and openings for audio jacks, etc. The gap 111 may be bridged by a conductor. According to an embodiment, the conductor may be an inductor configured to block currents corresponding to frequencies higher than those of NFC. Grounding components may be configured between the conductive structural member and PWB or device chassis 105. The grounding component 106 may be configured to ground currents corresponding to frequencies other than NFC.

Figure 2A:
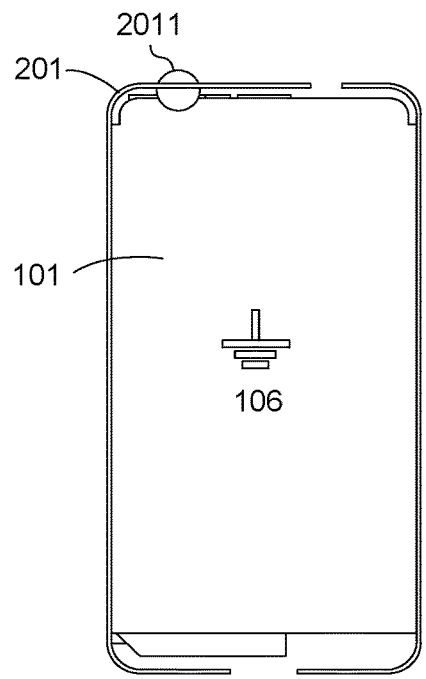
FIG. 2a is a schematic illustration of a mobile NFC device, according to an embodiment.
Figure 2B:
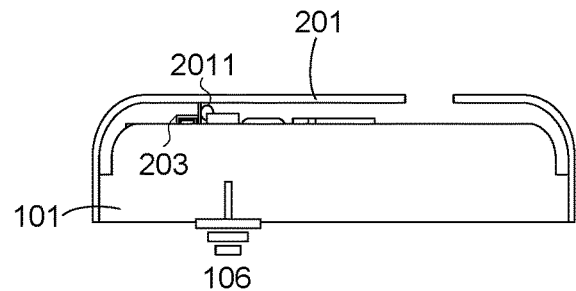
FIG. 2b illustrates the frame and back panel of the mobile NFC device, according to an embodiment.

FIGS. 2a and 2b show an example implementation of a mobile NFC device, according to an embodiment. The device may be a mobile phone, a tablet or any other mobile device equipped with NFC functionality. On FIG. 2a, the metallic back cover 101 together with a metallic frame 201 are used as a conductive structural member together. The back cover 101 includes the grounding component 106 as its extension. The top part of the device illustrated in FIG. 2a is shown in FIG. 2b, wherein the signal terminal 2011 is shown between the internal elements (NFC circuit) and the metallic frame 201 on the top side of the device. The metallic frame 201 is separated from the metallic back panel 101 by a slit along the top side of the metallic back panel 101. In an example embodiment, the slit may be 2.3 millimeters wide. A substantially circular path along the slit can be provided to the current in the conductive structural member. The slit may be due to design considerations and integration of other radios, such as a GPS/WLAN or other cellular connections, for which the separated part of the frame 201 may be used as an antenna.

Figure 3A:
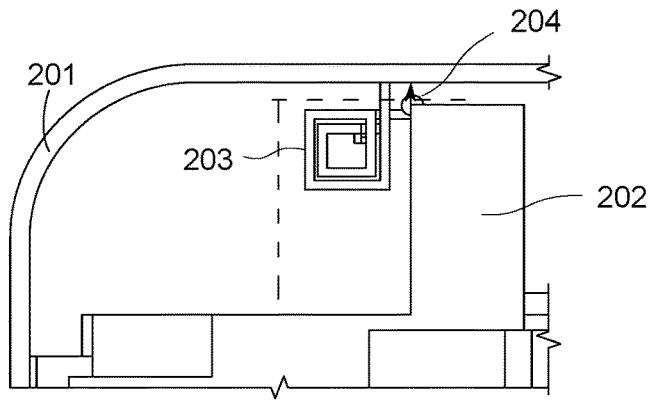
FIG. 3a illustrates the NFC circuit with the back panel removed.
Figure 3B:
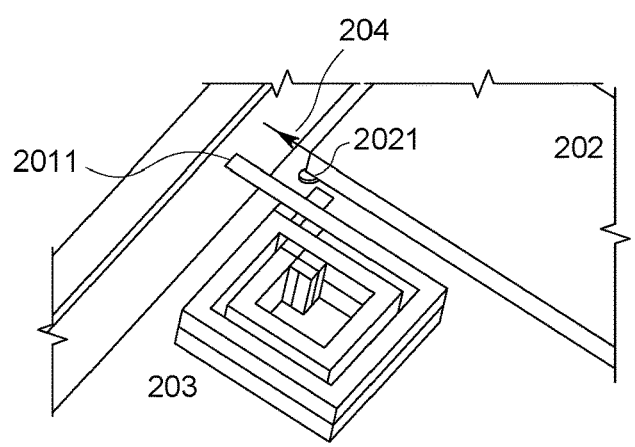
FIG. 3b illustrates an inductive coil through which a communication signal is supplied, according to an embodiment.

FIGS. 3a and 3b show the NFC device shown in FIGS. 2a-2b with the back panel 101 removed for illustration purposes. In this example, the device comprises an inductive coil 203 connected to the frame 201 and the NFC circuit 202 that provides an antenna feed. The coil may be etched on a printed wiring board (PWB), as indicated by a dashed line. The contact points are illustrated on FIG. 3b, where 2011 is the signal terminal or contact point between the inductive coil 203 and the conductive structural member acting as NFC antenna. Feed 2021 is the connection point between the inductive coil 203 and the NFC circuit 202.

The device may also include a capacitor 204, illustrated by an arrow, connected in parallel between the terminals of the coil 203. The capacitor 204, which may also be referred to as a load capacitor, can amplify the currents flowing in the conductive structural member.

Figure 4:
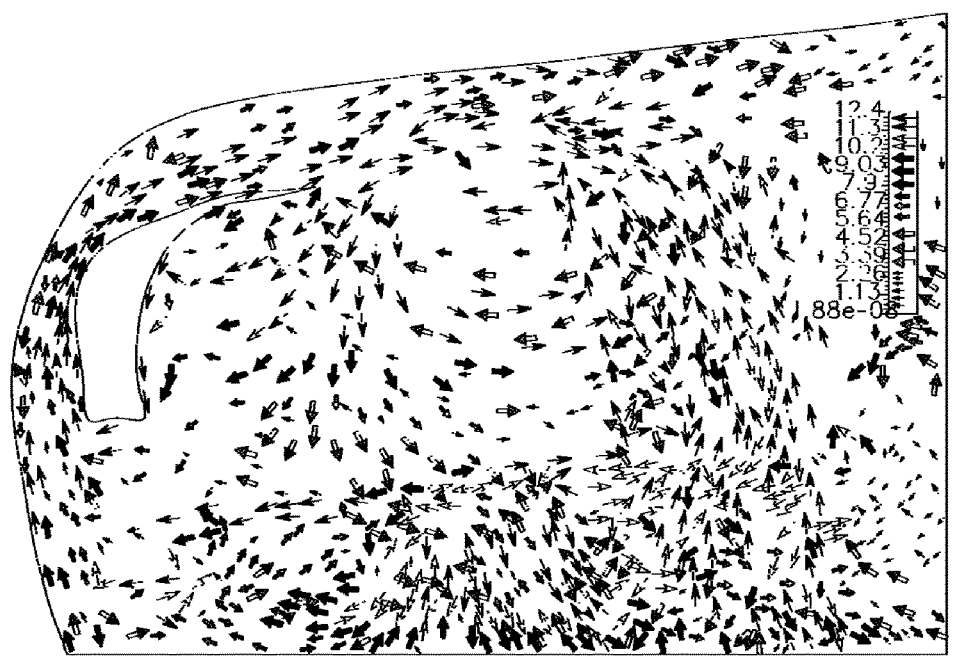
FIG. 4 illustrates current paths in a back panel used as an NFC antenna, according to an embodiment.

FIG. 4 is a general approximation of current paths in a back panel used as an NFC antenna, according to an embodiment. This shows how the currents may flow in a conductive structural member substantially in a circular or annular direction, creating magnetic fields suitable for NFC antenna operation. The portion of the back panel, as well as the connections inside the device, are substantially the same as those shown on FIG. 3a.

Figure 5A:
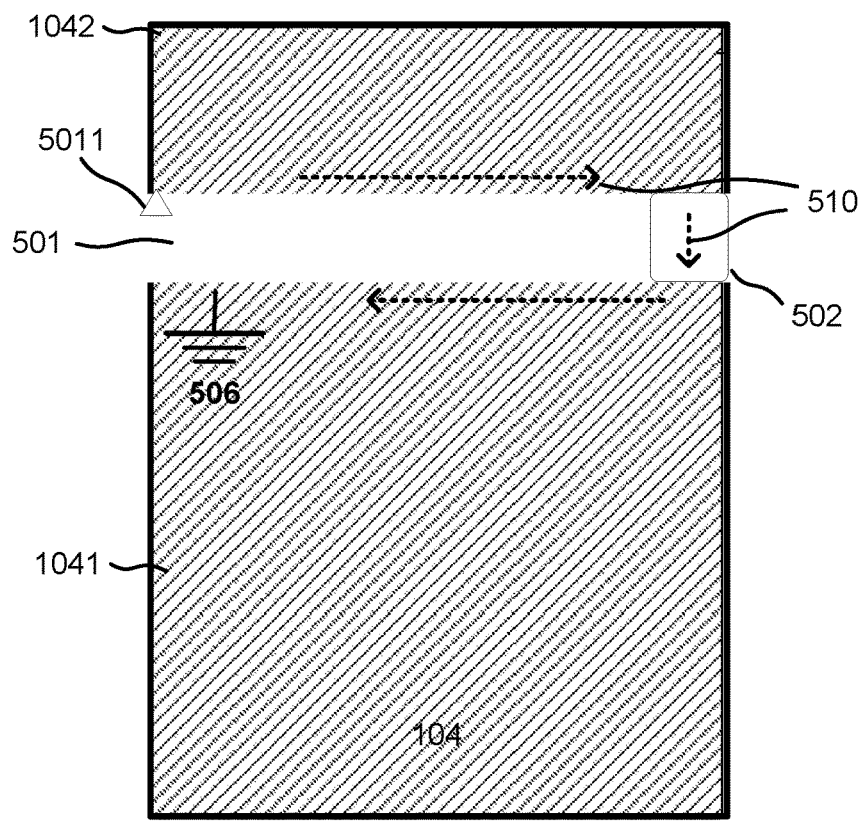
FIG. 5a illustrates an embodiment with the back panel having a slit.
Figure 5B:
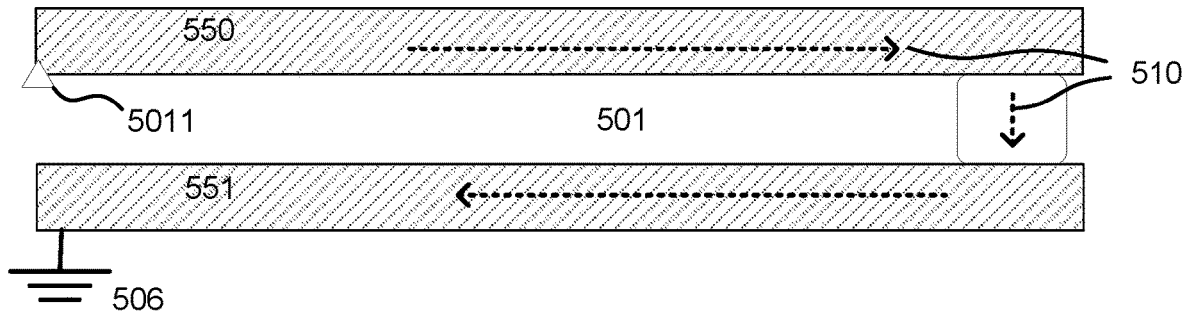
FIG. 5b illustrates an embodiment with other conductive structural members used as an NFC antenna.

FIGS. 5a-5b show two examples of numerous alternative implementations of conductive structural members used as a single-ended NFC antenna. FIG. 5a is a posterior view of a back cover of a device according to an embodiment. The back panel 104 has a slit 501 away from the top and bottom sides of the device. A signal terminal 5011 can be provided at one side of the open end of the slit 501, and a ground terminal 506 can be on the opposing side of the open end. As it is clear to a skilled person, the slit may not be in correct proportion in relation to the rest of the device; and may enclose other portions of the device not shown in FIG. 5a. The device also comprises a galvanic, capacitive or inductively coupled end 510 which provides the substantially circular current path 510 along the slit 501. In an example embodiment, the back panel 104 may be split in two parts by the slit 501, including a chassis 1041 and a cup 1042. This design allows positioning the NFC antenna loop in various portions of the back panel 104, and integrating the NFC antenna with other elements that may use the slit 501.

FIG. 5b illustrates an embodiment with other conductive structural members used as an NFC antenna. FIG. 5b is a side view of the conductive elements (other elements of the device are not shown for clarity). The device may comprise a uniform metallic back cover 550 and a metallic display support plane 551 on the opposite side. A current path 510 is formed between the signal terminal 5011 and the ground terminal 506 similar to the current path on FIG. 5a. This design can be useful if elements 550, 551 cannot have slits. This also allows creating an NFC antenna directed toward a lateral end of the device.

Components of a device according to any of the above embodiments may be implemented as a computing and/or electronic device. The device may comprise one or more processors which may be microprocessors, controllers or any other suitable type of processors for processing computer executable instructions to control the operation of the apparatus. Platform software comprising an operating system or any other suitable platform software may be provided on the apparatus to enable application software to be executed on the device.

Computer executable instructions may be provided using any computer-readable media that are accessible by the device. Computer-readable media may include, for example, computer storage media such as a memory and communications media. Computer storage media, such as a memory, includes volatile and non-volatile, removable and non-removable media implemented in any method or technology for storage of information such as computer readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals may be present in computer storage media, but propagated signals per se are not examples of computer storage media. The storage media may be located inside the device 100, distributed or located remotely and accessed via a network or other communication link.

Figure 6:
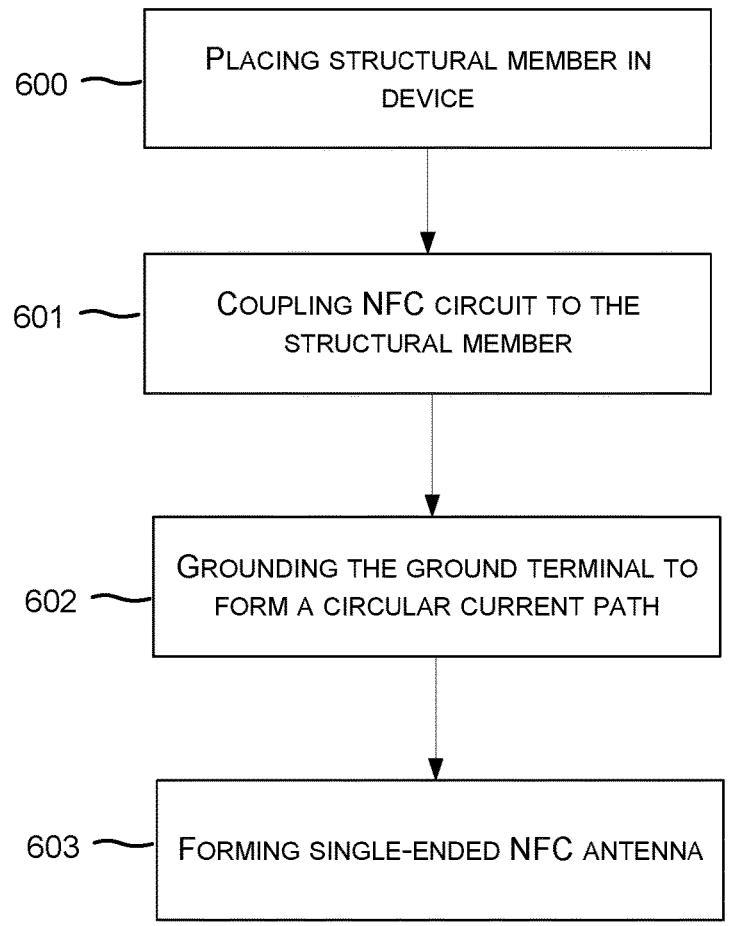
FIG. 6 illustrates a schematic flow chart of a method of implementing an NFC antenna in a device in accordance with an embodiment.

FIG. 6 illustrates, as a schematic flow chart, a method in accordance with an embodiment. The method may be a method for implementing or manufacturing a device with a conductive structural member acting as NFC antenna. According to an embodiment the process comprises operations 600, 601, 602 and 603. According to an embodiment, the process of FIG. 6 may be compiled into a program code.

Operation 600 may include configuring a conductive structural member in a device or around the edges of a PWB comprising the device. The conductive structural member comprises a single signal terminal and a ground terminal in the device.

Operation 601 may include coupling an NFC circuit to the conductive structural member, wherein the NFC circuit is configured to supply a communication signal to the single signal terminal of the conductive structural member.

Operation 602 may include grounding the ground terminal of the conductive mechanical element by adding a return path for the communication signal such that a substantially circular path is provided to the current in the conductive structural element. According to an embodiment, the operation 602 may include selective grounding of frequencies corresponding to NFC.

Operation 603 may include forming a single-ended NFC antenna by completing the operations above and sealing the device.

The methods and functionalities described herein may be performed by software in machine readable form on a tangible storage medium e.g. in the form of a computer program comprising computer program code means adapted to perform all the functions and the steps of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store, parts or all of, an example of the process described as software. A local or terminal computer may access the remote computer and download a part or all of the software to run the program. Alternatively, the local computer may download pieces of the software as needed, or execute some software instructions at the local terminal and some at the remote computer (or computer network). Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Any range or device value given herein may be extended or altered without losing the effect sought. Also any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

The embodiments illustrated and described herein as well as embodiments not specifically described herein but within the scope of aspects of the disclosure constitute exemplary means for conductive structural members of the device acting as NFC antenna. For example, the elements illustrated in FIG. 1 to FIG. 5 constitute exemplary means for a conductive structural member, means for a signal terminal, NFC antenna feeding means, grounding means, connecting means, feeding means for a frequency other than that of NFC.

According to an aspect, a device is provided. The device comprises: a conductive structural member including a single signal terminal and a ground terminal, the conductive structural member forming a single ended Near-Field Communication (NFC) antenna element; an NFC circuit configured to supply a communication signal to the signal terminal of the conductive structural member, and a grounding component operable as a return path for the communication signal via the ground terminal of the conductive structural member.

In an embodiment, the device further comprises an inductive coil, wherein the NFC circuit is coupled to the signal terminal of the conductive structural member via the inductive coil.

In an embodiment, in addition to the above embodiment, the device further comprises a printed wiring board (PWB), wherein the inductive coil is etched in the PWB.

Additionally, the device may further comprise a capacitor connected in parallel to the conductive structural member and the inductive coil.

In an embodiment, alternatively or in addition to the above embodiments, the device further comprises a conductive device cover, wherein the conductive structural member comprises at least part of the conductive device cover.

According to an embodiment, in addition to the above embodiment, the conductive device cover, the single signal terminal and the ground terminal are arranged such that substantially circular paths are provided to the currents in the conductive structural member.

In an embodiment, alternative to the above embodiment, the conductive device cover comprises a metallic back panel, and the conductive structural member comprises at least part of the metallic back panel.

In an embodiment, in addition to the above embodiment, the conductive device cover comprises a metallic frame connected to the metallic back panel, and the metallic back panel together with the metallic frame form the conductive structural member.

According to an embodiment, in addition to the above embodiment, the metallic frame is separated from the metallic back panel by a slit along a side of the metallic back panel, and the single signal terminal is positioned on the same side of the metallic back panel.

In an embodiment, alternatively to the above embodiments, the conductive device cover has a slit, and the single signal terminal and the ground terminal are arranged such that a substantially circular path along the slit is provided for the current in the conductive structural member.

In an embodiment, alternatively or in addition to the above embodiments, the conductive structural member forms a continuous single-ended NFC antenna loop.

In an embodiment, alternatively or in addition to the above embodiments, the device further comprises a printed wiring board (PWB), wherein the conductive structural member comprises at least part of the PWB.

In an embodiment, alternatively or in addition to the above embodiments, the grounding component is a structural extension of the conductive structural member.

In an embodiment, alternatively or in addition to the above embodiments, at least one additional antenna feed is coupled to the conductive structural member via a capacitor. Further according to the embodiment, elements of the conductive structural member are arranged such that the at least one additional antenna feed is filtered from the NFC signals, wherein the at least one additional antenna feed is configured for a frequency range suitable for at least one of: Wireless Local Area Network, FM-Radio, Long Term Evolution Wideband Low Band, Global Navigation Satellite System, Global Positioning System, BeiDou Satellite Navigation System, or a non-cellular wireless system.

In a second aspect, a device is presented. The device comprises: a conductive device cover including a single signal terminal and a ground terminal, the conductive device cover forming a single ended Near-Field Communication (NFC) antenna element; a printed wiring board (PWB) and an inductive coil etched in the PWB; an NFC circuit comprising an integrated circuit and a matching circuit, the NFC circuit being coupled to the signal terminal of the conductive device cover via the inductive coil, and configured to supply a communication signal at a frequency of 13.56 megahertz to the signal terminal of the conductive device cover; a capacitor connected in parallel to the conductive device cover; and a grounding component operable as a return path for the communication signal via the ground terminal of the conductive device cover.

In an embodiment, the conductive device cover comprises a metallic back panel.

In an embodiment, in addition to the above embodiment, the conductive device cover further comprises a metallic frame connected to the metallic back panel. The metallic frame is separated from the metallic back panel by a slit along a side of the metallic back panel, and the single signal terminal is positioned on the same side of the metallic back panel.

In an embodiment, alternatively or in addition to the above embodiments, the single signal terminal and the ground terminal of the conductive device cover are arranged such that substantially circular paths are provided to the currents in the conductive device cover.

In an embodiment, alternatively or in addition to the above embodiments, the grounding component is a structural extension of the conductive device cover.

In a third aspect, a method is presented. The method comprises: placing a conductive structural member comprising a single signal terminal and a ground terminal in a device; coupling, to the conductive structural member, an NFC circuit configured to supply a communication signal to the single signal terminal of the conductive structural member, and grounding the ground terminal of the conductive structural member by adding a return path for the communication signal such that a substantially circular path is provided to the current in the conductive structural element.

In a fourth aspect, an apparatus is provided. The apparatus comprises: means for placing a conductive structural member comprising a single signal terminal and a ground terminal in a device; means for coupling, to the conductive structural member, an NFC circuit configured to supply a communication signal to the single signal terminal of the conductive structural member; and means for grounding the ground terminal of the conductive structural member by adding a return path for the communication signal such that a substantially circular path is provided to the current in the conductive structural element.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method, blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A device, comprising:
a conductive structure comprising a conductive frame and a ground terminal, the conductive structure forming a single ended Near-Field Communication (NFC) antenna element;
a single signal terminal directly coupled to the conductive frame;
an inductive coil comprising a first end and a second end, the first end directly coupled to the single signal terminal;
an NFC circuit coupled to the second end, the NFC circuit configured to supply a communication signal to the signal terminal through the inductive coil, and a grounding component operable as a return path for the communication signal via the ground terminal.

2. The device of claim 1, wherein the NFC circuit is coupled to the signal terminal of the conductive frame via the inductive coil.

3. The device of claim 2, further comprising a printed wiring board (PWB), wherein the inductive coil is etched in the PWB.

4. The device of claim 3, further comprising a capacitor connected in parallel to the conductive frame and the inductive coil.

5. The device of claim 3, wherein the grounding component is between the conductive frame and the PWB, the grounding component configured to ground currents corresponding to frequencies other than the NFC.

6. The device of claim 1, further comprising a conductive device cover, wherein the conductive frame comprises at least part of the conductive device cover, and wherein the conductive device cover, the single signal terminal and the ground terminal are arranged such that substantially circular paths are provided to the currents in the conductive frame.

7. The device of claim 6, wherein the conductive device cover comprises a metallic back panel, and the conductive frame comprises at least part of the metallic back panel.

8. The device of claim 7, wherein the conductive device cover comprises a metallic frame connected to the metallic back panel, and the metallic back panel together with the metallic frame form the conductive frame.

9. The device of claim 8, wherein the metallic frame is separated from the metallic back panel by a slit along a side of the metallic back panel, and wherein the single signal terminal is positioned on the same side of the metallic back panel.

10. The device of claim 6, wherein the conductive device cover has a slit, and the single signal terminal and the ground terminal are arranged such that a substantially circular path along the slit is provided for the current in the conductive frame.

11. The device of claim 1, wherein the conductive frame forms a continuous single-ended NFC antenna loop.

12. The device of claim 1, wherein the second end of the inductive coil is directly coupled to the NFC circuit.

13. The device of claim 1, further comprising a capacitor that amplifies the communication signal and increases a performance of the NFC antenna element or filters other antennas and radios from interacting with NFC signals, and wherein a first end of the capacitor is directly coupled to the frame and a second end of the capacitor is directly coupled to the NFC circuit.

14. A device comprising:
a conductive device cover comprising a frame and a ground terminal, the conductive device cover forming a single ended Near-Field Communication (NFC) antenna element;
a single signal terminal directly coupled to the frame;
a printed wiring board (PWB) and an inductive coil etched in the PWB, the inductive coil comprising a first end and a second end, the first end directly coupled to the single signal terminal;
an NFC circuit coupled to the second end, the NFC circuit comprising an integrated circuit and a matching circuit, the NFC circuit being coupled to the signal terminal of the conductive device cover, and configured to supply a communication signal at a frequency of 13.56 megahertz to the signal terminal through the inductive coil;
a capacitor connected in parallel to the conductive device cover; and
a grounding component operable as a return path for the communication signal via the ground terminal of the conductive device cover.

15. The device of claim 14, wherein the conductive device cover comprises a gap bridged by a conductor configured to block currents corresponding to frequencies higher than those of the NFC.

16. The device of claim 14, wherein
the conductive device cover further comprises a metallic frame connected to the metallic back panel;
the metallic frame is separated from the metallic back panel by a slit along a side of the metallic back panel; and
the single signal terminal is positioned on the same side of the metallic back panel.

17. The device of claim 14, wherein the single signal terminal and the ground terminal of the conductive device cover are arranged such that substantially circular paths are provided to the currents in the conductive device cover.

18. The device of claim 14, wherein the grounding component is between the conductive frame and a device chassis, the grounding component configured to ground currents corresponding to frequencies other than NFC.

19. A method, comprising:
placing a conductive structure comprising a conductive frame and a ground terminal in a device;
coupling a single signal terminal directly to the conductive frame;
coupling a first end of an inductive coil directly to the single signal terminal;
supplying a communication signal through the inductive coil by coupling a second end of the inductive coil to an NFC circuit, and
grounding the ground terminal of the conductive frame by adding a return path for the communication signal.

20. The device of claim 14, further comprising an inductive coil, wherein the NFC circuit is coupled to the signal terminal of the conductive device cover via the inductive coil.

* * * * *